United States Patent
Ajmera et al.

(10) Patent No.: US 9,691,024 B2
(45) Date of Patent: *Jun. 27, 2017

(54) KNOWLEDGE-BASED EDITOR WITH NATURAL LANGUAGE INTERFACE

(71) Applicant: International Business Machines Corporation, Armonk, NY (US)

(72) Inventors: Jitendra Ajmera, New Delhi (IN); Sathish R. Indurthi, Bangalore (IN); Sachindra Joshi, Gurgaon (IN); Dinesh Raghu, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,266

(22) Filed: Jan. 10, 2017

(65) Prior Publication Data

US 2017/0147924 A1 May 25, 2017

Related U.S. Application Data

(63) Continuation of application No. 14/950,309, filed on Nov. 24, 2015.

(51) Int. Cl.
*G06F 17/30* (2006.01)
*G06N 5/02* (2006.01)
(Continued)

(52) U.S. Cl.
CPC ............ *G06N 5/02* (2013.01); *G06F 17/274* (2013.01); *G06F 17/2705* (2013.01);
(Continued)

(58) Field of Classification Search
None
See application file for complete search history.

(56) References Cited

U.S. PATENT DOCUMENTS 6,499,024 B1 * 12/2002 Stier ...................... G06N 5/022
706/50
8,938,450 B2   1/2015 Spivack et al.
(Continued)

FOREIGN PATENT DOCUMENTS

WO   9953676 A1   10/1999
WO   0075808 A1   12/2000

OTHER PUBLICATIONS

Tudorache et al. "WebProtégé: A Collaborative Ontology Editor and Knowledge Acquisition Tool for the Web", Semantic Web 11-165, IOS Press, 2011. IOS Press.*
(Continued)

*Primary Examiner* — Jialong He
(74) *Attorney, Agent, or Firm* — Reza Sarbakhsh

(57) ABSTRACT

A computer-implemented method for knowledge based ontology editing, is provided. The method receives a language instance to update a knowledge base, using a computer. The method semantically parses the language instance to detect an ontology for editing. The method maps one or more nodes for the ontology for editing based on an ontology database and the knowledge base. The method determines whether the mapped nodes are defined or undefined within the knowledge base. The method calculates a first confidence score based on a number of the defined and undefined mapped nodes. Furthermore, the method updates the knowledge base when the first confidence score meets a pre-defined threshold.

1 Claim, 5 Drawing Sheets

(51) Int. Cl.
*G06N 7/00* (2006.01)
*G06F 17/27* (2006.01)

(52) U.S. Cl.
CPC ........ *G06F 17/278* (2013.01); *G06F 17/2785* (2013.01); *G06F 17/30654* (2013.01); *G06N 7/005* (2013.01)

(56) References Cited

U.S. PATENT DOCUMENTS

| | | | |
|---|---|---|---|
| 2002/0032574 | A1 | 3/2002 | Lowrance et al. |
| 2002/0194154 | A1 | 12/2002 | Levy et al. |
| 2003/0018616 | A1 | 1/2003 | Wilbanks et al. |
| 2004/0103090 | A1 | 5/2004 | Dogl et al. |
| 2004/0117335 | A1 | 6/2004 | Cuddihy et al. |
| 2006/0053382 | A1* | 3/2006 | Gardner ............... G06F 3/0482 715/764 |
| 2006/0206883 | A1 | 9/2006 | Sabbouh |
| 2009/0077124 | A1 | 3/2009 | Spivack et al. |
| 2010/0100546 | A1 | 4/2010 | Kohler |
| 2010/0205229 | A1* | 8/2010 | Jung ................. G06F 17/30997 707/805 |
| 2010/0299139 | A1* | 11/2010 | Ferrucci ............ G06F 17/30654 704/9 |
| 2011/0264649 | A1* | 10/2011 | Hsiao ..................... G06N 5/022 707/722 |
| 2012/0185480 | A1* | 7/2012 | Ni ....................... G06F 17/3071 707/737 |
| 2012/0191716 | A1 | 7/2012 | Omoigui |
| 2012/0303356 | A1* | 11/2012 | Boyle ............... G06F 17/30672 704/9 |
| 2013/0290241 | A1* | 10/2013 | Taylor ..................... G06N 5/02 706/55 |
| 2014/0324806 | A1* | 10/2014 | Ghosal .............. G06F 17/30864 707/706 |
| 2015/0046392 | A1 | 2/2015 | Trog et al. |
| 2015/0095303 | A1 | 4/2015 | Sonmez et al. |

OTHER PUBLICATIONS

Maedche et al. "Ontologies for Enterprise Knowledge Management", IEEE Intelligent Systems, 2003.*
Protégé, "A free, open-source ontology editor and framework for building intelligent systems", http://protege.stanford.edu/, printed on Jul. 14, 2015, pp. 1-2.
CognituM, "Fluent Editor 2014", http://www.cognitum.eu/semantics/FluentEditor/, printed on Jul. 14, 2015, pp. 1-6.
Semafora Systems GmbH, "Semantic Infrastructure OntoStudio", copyright 2012, http://www.semafora-systems.com/en/products/ontostudio/, p. 1.
Bergman, "The Sweet Compendium of Ontology Building Tools", Jan. 26, 2010, http://www.mkbergman.com/862/the-sweet-compendium-of-ontology-building-tools/, pp. 1-12.
WIKIPEDIA, "Ontology Editor", Wikipedia, the free encyclopedia, https://en.wikipedia.org/wiki/Ontology_editor, printed on Jul. 14, 2015, pp. 1-3.
Berant et al., "Semantic Parsing on Freebase from Question-Answer Pairs", EMNLP 2013, pp. 1-12.
Yao et al., "Freebase QA: Information Extraction or Semantic Parsing?", Proceedings of the ACL 2014 Workshop on Semantic Parsing, Jun. 26, 2014, pp, 82-86.
Carbonell et al., "The XCALIBUR Project A Natual Language Interface to Expert Sysems and Data Bases", Carnegie Mellon University, Research Showcase, 1985, pp. 1-5.
Funk et al., "CLOnE: Controlled Language for Ontology Editing", ISWC/ASWC 2007, LNCS 4825, pp. 142-155.
IBM: List of IBM Patents or Patent Applications Treated As Related (Appendix P), Jan. 11, 2017, pp. 1-2.
U.S. Appl. No. 14/950,309, filed Nov. 24, 2015, entitled: "Knowledge-Based Editor With Natural Language Interface", pp. 1-30.
U.S. Appl. No. 15/069,099, filed Mar. 14, 2016, entitled: "Knowledge-Based Editor With Natural Language Interface", pp. 1-27.
U.S. Appl. No. 15/402,264, filed Jan. 10, 2017, entitled: "Knowledge-Based Editor With Natural Language Interface", pp. 1-27.

* cited by examiner

KNOWLEDGE-BASED EDITOR WITH NATURAL LANGUAGE INTERFACE

BACKGROUND

The present disclosure relates generally to computer systems for natural language and knowledge based editing.

In computer science and information science, an ontology is a formal naming and definition of the types, properties, and interrelationships of the entities that fundamentally exist for a particular domain of discourse. An ontology can be explained as the explicit formal specifications of a particular word/term in a linguistic domain and the relations among those specifications. In recent years the development of ontologies has generally been moving to the desktops of domain experts. Ontologies have become common on the World-Wide Web and other computer-related programs. Uses of ontologies could range from large taxonomies categorizing web sites to categorizations of products for sale and their features.

Currently, ontology editors can include applications designed to assist in the creation or manipulation of ontologies. Existing editors can express ontologies in one of many ontology languages. An ontology language typically allows the encoding of knowledge about specific domains and often includes reasoning rules that support the processing of that knowledge.

SUMMARY

The present disclosure implements a system, method, and computer program product for natural language and knowledge based editing.

In an embodiment, a method for a knowledge based ontology editor, is provided. The method includes receiving a language instance, on a computer, in order to update a knowledge base communicating with the computer. The method includes semantically parsing the language instance in order to detect an ontology to be edited. The method includes mapping the ontology for editing based on an ontology database and the knowledge base. The method includes determining whether the mapped nodes are defined within the knowledge base. The method includes assigning a first confidence score to the ontology based on defined nodes and updating the knowledge base when the first confidence score satisfies a pre-defined threshold.

In another embodiment, a computer system for natural language and knowledge based editing is provided. The computer system includes receiving a language instance, on a computer, in order to update a knowledge base communicating with the computer. The computer system includes semantically parsing the language instance in order to detect an ontology for editing. The computer system includes mapping the ontology for editing based on an ontology database and the knowledge base. The computer system includes determining whether the mapped nodes are defined within the knowledge base. The computer system includes assigning a first confidence score to the ontology based on defined nodes and updating the knowledge base when the first confidence score satisfies a pre-defined threshold.

In another embodiment, a computer program product for natural language and knowledge based editing is provided. The computer program product includes receiving a language instance, on a computer, in order to update a knowledge base communicating with the computer. The computer program product includes semantically parsing the language instance in order to detect an ontology for editing. The computer program product includes mapping the ontology for editing based on an ontology database and the knowledge base. The computer program product includes determining whether the mapped nodes are defined within the knowledge base. The computer program product includes assigning a first confidence score to the ontology based on defined nodes and updating the knowledge base when the first confidence score satisfies a pre-defined threshold.

DETAILED DESCRIPTION

Figure 1A:
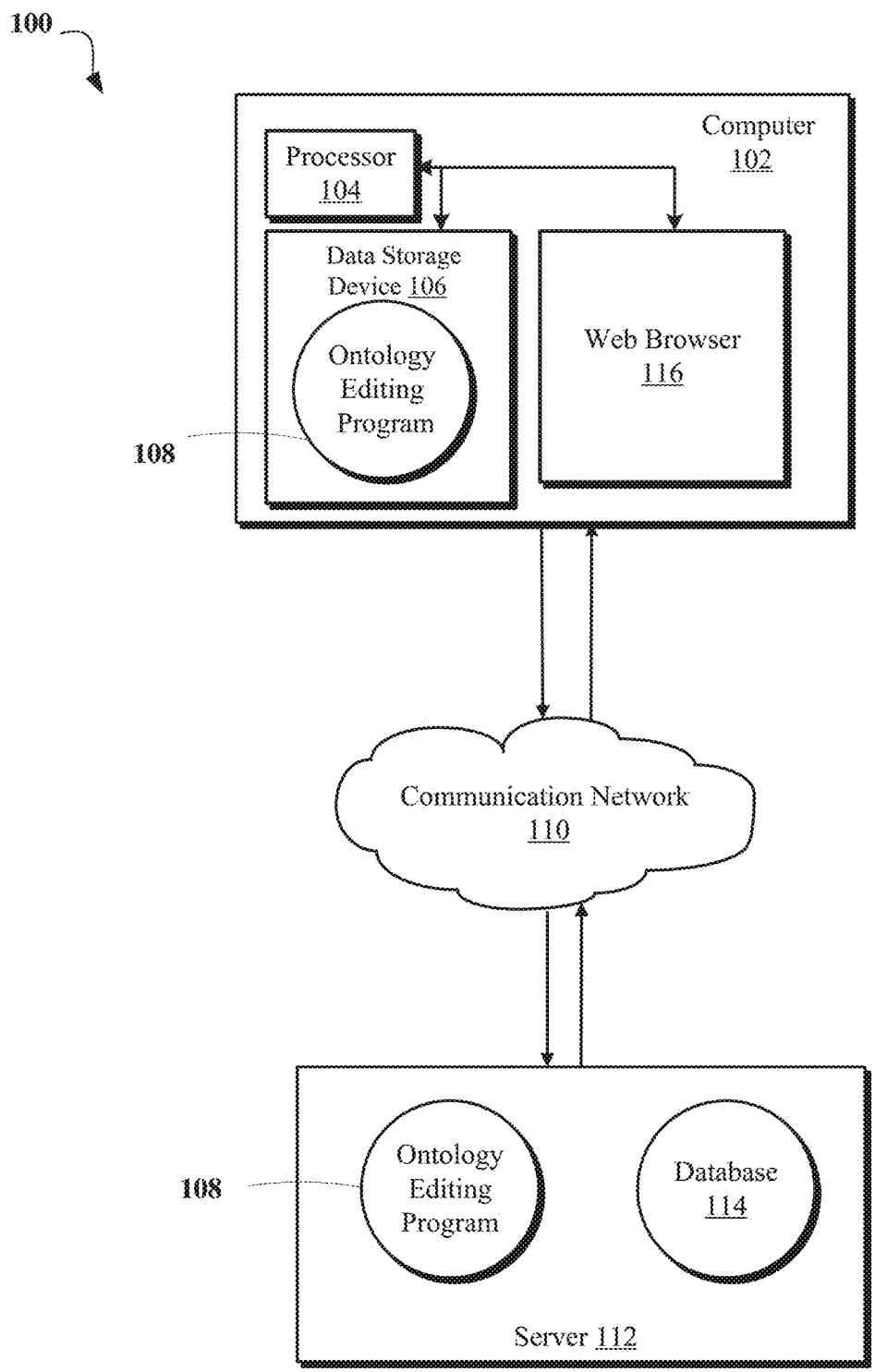
FIG. 1A is schematic block diagram depicting an exemplary computing environment for an ontology editing program, in accordance with an aspect of the present disclosure.

FIG. 1A depicts a computing environment 100 for managing the display of application forms within a web-based application. In various embodiments of the present disclosure, the computing environment 100 may include a computer 102 and server 112 connected over communication network 110.

A computer 102 may include a processor 104 and a data storage device 106 that is enabled to run an ontology editing program 108 and a web browser 116 that may display an application form or a user interface for the user to work an ontology editing program 108. Non-limiting examples of a web browser may include: Firefox®, Explorer®, or any other web browser. All brand names and/or trademarks used herein are the property of their respective owners.

The computing environment 100 may also include a server 112 with a database 114. The server 112 may be enabled to run a program such as an ontology editing program 108. A communication network 110 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Communication network 110 may also include a number of different types of networks, such as, for example, an intranet, a local area network (LAN), or a wide area network (WAN).

It should be appreciated that FIG. 1A provides only an illustration of one implementation and does not imply any limitations with regard to the environments in which different embodiments may be implemented. Many modifications to the depicted environments may be made based on design and implementation requirements.

The computer 102 may communicate with the server 112 via the communication network 110. The communication network 110 may include connections, such as wire, wireless communication links, or fiber optic cables.

The computer 102 and the server 112 may be, for example, a mobile device, a telephone, a personal digital assistant, a netbook, a laptop computer, a tablet computer, a desktop computer, or any type of computing device capable of running a program and accessing a network. A program, such as an ontology editing program 108 may run on the computer 102 or on the server 112. It should be appreciated that ontology editing program 108 has the same component and operation methods regardless of whether it is run on the server 112 or computer 102. Therefore ontology editing program 108 applies to both ontology editing program 108 run on a computer 102 and ontology editing program 108 run on the server 112 are interchangeably used throughout this disclosure.

Figure 1B:
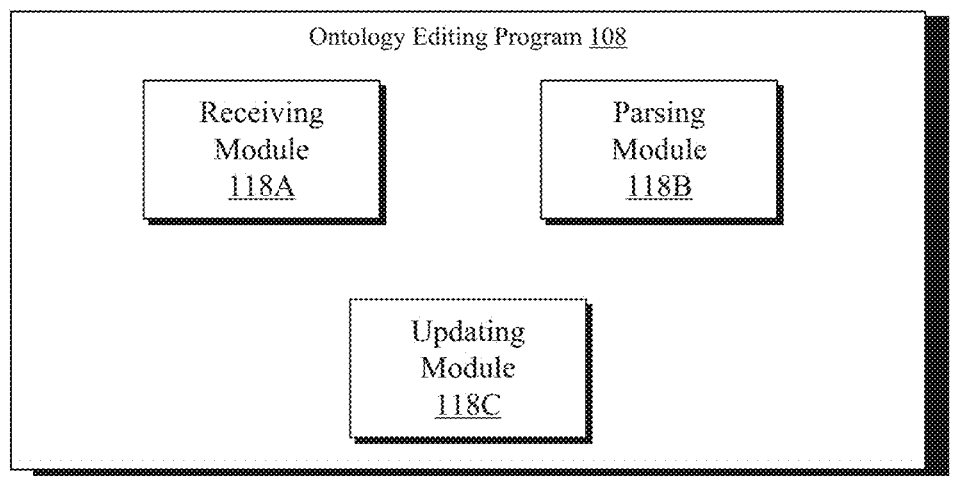
FIG. 1B is as schematic block diagram depicting components of an ontology editing program, in accordance with an aspect of the present disclosure.

Referring now to FIG. 1B, different modules of ontology editing program 108 are depicted. Ontology editing program 108 includes three modules of receiving module 118A, parsing 118B, and updating module 118C. Briefly explained, receiving module 118A, may receive a language instance (sentence or one or more words from a user) in order to update an existing ontology or knowledge base. Parsing module 118B may parse the language instance and detect the ontology for editing, map the nodes for the ontology for editing, and determine whether the mapped nodes are defined within the existing knowledge or ontology base. Updating module 118C, may, based on the number of defined nodes, assign a confidence score to the ontology for editing and update the existing knowledge base based on the language instance (including the ontology for editing) if the confidence score satisfied a pre-determined threshold.

Figure 2:
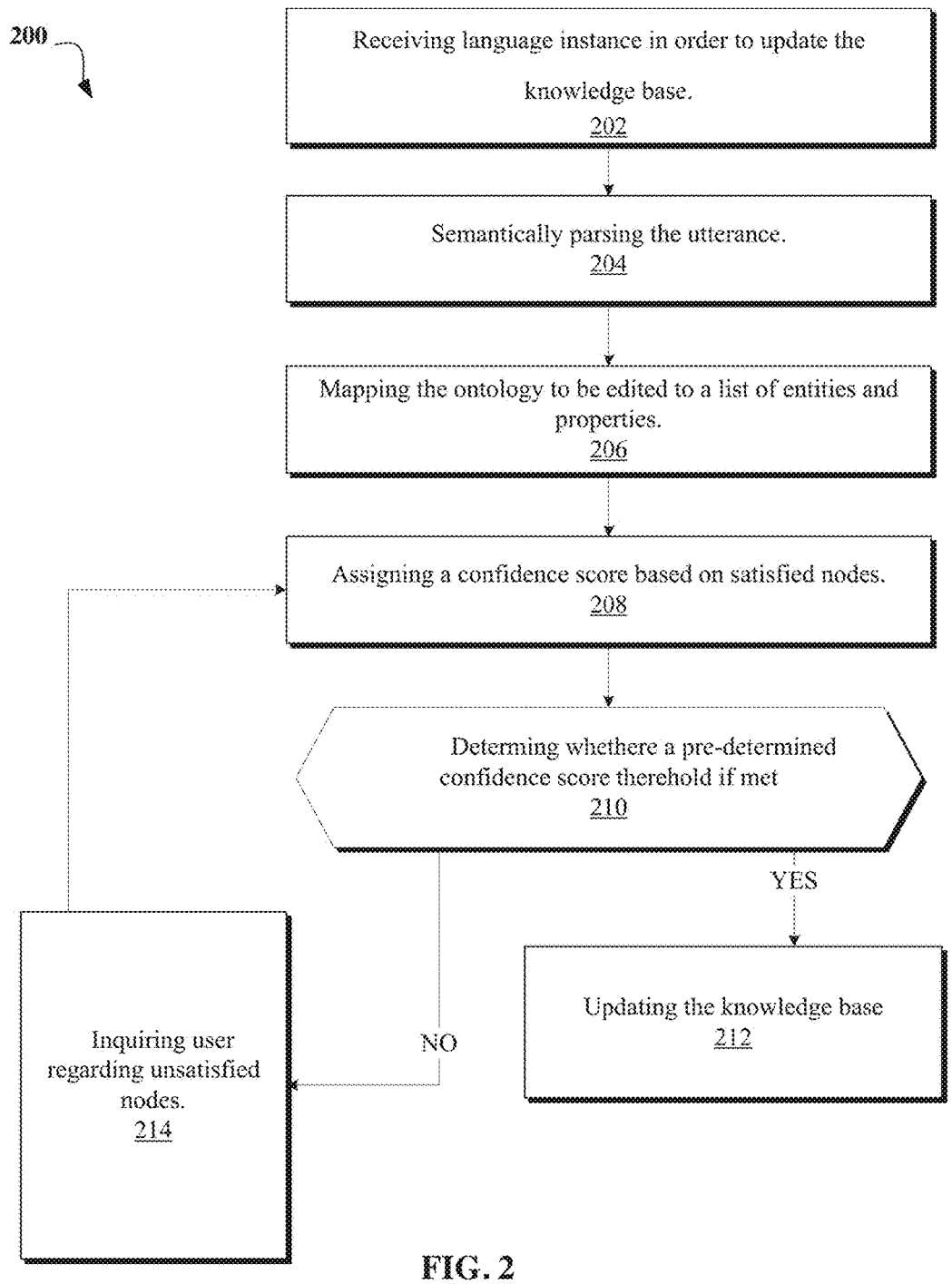
FIG. 2 is a flowchart depicting operational steps of a method for an ontology editing program, in accordance with an embodiment of the present disclosure.
Figure 3:
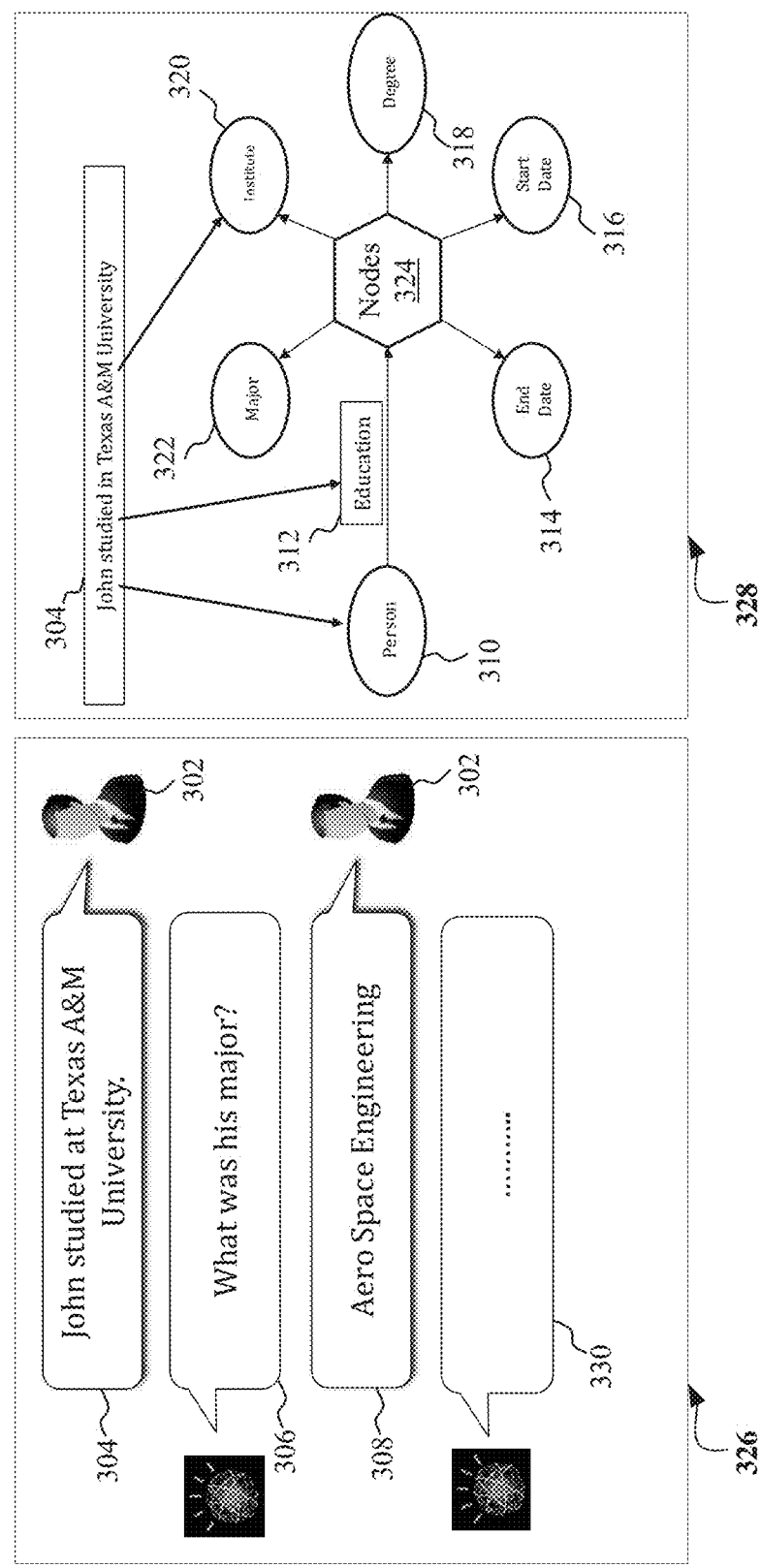
FIG. 3A is a schematic block diagram depicting operations of an ontology editing program by illustrating a User Interface for an ontology editing program, according to an embodiment of the present disclosure.
FIG. 3B is a schematic block diagram depicting operations of an ontology editing program by illustrating a graphical representation of mapped nodes, according to an embodiment of the present disclosure.

In reference to FIG. 2, steps of method 200, in conjunction with the depicted embodiment in FIG. 3A-B, may be implemented using one or more modules of a computer program, for example, ontology editing program 108, and executed by a processor of a computer, such as computer 102. It should be appreciated that FIG. 2 does not imply any limitations with regard to the environments or embodiments which may be implemented. Many modifications to the depicted environment or embodiment shown in FIG. 2 may be made.

At 202, receiving module 118A may receive a language instance from an electronic input source. A language instance (or an utterance) may, in one embodiment, be a digital text stream comprising one or more words or sentences (whether grammatically categorized as a complete sentence or a fragment). Receiving module 118A may receive the language instance from an electronic input source. Receiving module 118A may receive the word(s) from a user or a computer implemented system. Non-limiting examples of an input source may be spoken words, typed words, or inputting a corpus electronically from a computer implemented source such as an electronic device (e.g. cell phones or tablets).

In the present embodiment, and as depicted in FIG. 3A, receiving module 118A receives a language instance 304 from user 302. In the present embodiment, user 302 speaks the language instance 304 into a microphone built in computer 102 equipped with ontology editing program 108 which is then received by the receiving module 118A. Language instance 304 has a content of "John studied at Texas A&M University". User interface 326, represent an example of a user interface for the ontology editing program 108.

At 204, parsing module 118B, may parse the language instance into different words and analyze each of the parsed words in order to detect the ontology for editing. The ontology for editing is simply a word or a phrase within the language instance received which is meant, by the user, to update or edit an existing knowledge base. A knowledge base is, in short, all the nodes and edges which are instances of (node types and edges definitions) in the ontology together form the knowledge base. Ontology can be thought as the schema that defines the properties that a node or edge should satisfy in the graph that is to being built. The ontology is represented using a graph. For example, the ontology may contain nodes like Person, Location, etc., and edges like Place Lived (between Person and Location). Real world entities like Obama (Person), New York (Location) are usually not a part of the ontology. These are called instances of the nodes in the ontology. These instances of nodes in ontology form the knowledge base.

In this disclosure, it is assumed that the ontology is already given to us or pre-loaded. And ontology editing program 108 populates the knowledge base by interacting with the user.

In one embodiment, parsing module 118B may identify the ontology for editing by using predetermined grammatical values. In that embodiment, parsing module 118B may parse the language instance grammatically and use simple inferences in order to determine ontology for editing and the content of the edit by inferring. For example parsing module 118B may be pre-programmed to detect the subject of the sentence and identify it as the ontology for editing. In that embodiment a sentence such as "John was born in NYC" may be parsed and John maybe detected as the subject of the sentence and therefore identified as the ontology for editing.

In another embodiment, parsing module 118B may, convert the language instance to a representation that the updating module 118C can understand in order to update the knowledge base. Parsing module 118B may, in this embodiment, narrow down the edge followed by nodes. Semantic parser has the ability to detect all nodes types and edges defined in the ontology. The semantic parser may convert language instance into a graph structure. Semantic Parser may detect all edges and node in the user language instance and also defines a graph structure by linking the node and edges in the right order. This could be done either rule based or by statistical approaches. In an embodiment, parsing module 118B may use the following in order to create rules or to build a statistical model: Gazetteers/Dictionaries (of entity types, representative relation phrases etc.), words, Phrases (in the user's language instance), part-Of-Speech (POS) Tags (of the user's language instance), constituency/dependency Parse Trees (of the user's language instance), semantic parsing in general refers to converting a unstructured text to a structured form. The structure in the present embodiment is a graph, and the built graph follows the ontology.

In another embodiment, parsing module 118B may also augment the semantic parsing with a rule based approach. In that embodiment, parsing module 118B may use pre-constructed and pre-defined rules in order to determine and parse the language instance. In that embodiment, rules may be constructed using words, POS tags, or dependency or constituency parse trees. POS is abbreviation for Part-Of-Speech. Given a list of words (in sequence) in a sentence, the part of speech tagger will assign a language dependent part of speech for each word. For example, if the input is IBM is a company, the output will be IBM—noun, is—verb, a—determiner, company—noun. POS tagging is a form of word-category disambiguation, and the process of marking up a word in a text (corpus) as corresponding to a particular part of speech, based on both its definition, as well as its context. POS tagging is done in the context of computational linguistics, using algorithms which associate discrete terms, as well as hidden parts of speech, in accordance with a set of descriptive tags. For example, in an embodiment, a rule may be implemented that presence of a phrase "is a" and absence of a main verb may indicate a type of relation from subject of the sentence to direct object of the sentence. In that example, "IBM is a company" may be parsed and understood that: IBM→company.

At 206, parsing module 118B may map the parsed language instance to different nodes and detect categories to the parsed words based on the word and ontology bank of information or a knowledge graph. In an embodiment parsing module 118B may use a Linking Open Data. A Linking Open Data (LOD) is a web data form. An LOD data set may be regarded as a gigantic graphic data structure. An LOD node is a structured data form, which may comprise a plurality of property entries, for example, data type properties, name properties, etc. So far, the LOD program has included more than 100 LOD data sets and more than 4.2 billion property entries. In these property entries, nearly 8 million pieces are attribute entries of relevant types. The LOD node typically has a certain correspondence relationship with a web page, which is adapted to fact that LOD data sets are created by a great number of users on the web. Any parsed named entity very likely corresponds to one or more LOD nodes in an LOD data set. In other words, parsed named entity is identical or similar to some name attributes of the one or more LOD nodes. Moreover, each LOD node may already be tagged with at least one type. Thus, existing type information in the LOD data set may be used to help automatic classification of a named entity. This method of facilitating classification may be taken as a supplement or replacement to a machine learning-based method.

In the present embodiment and depicted in FIG. 3B, parsing module 118B, using the above mentioned formulas, parses the language instance into different words "John" "studied" "at" Texas A&M University" and creates a graphical structure of the mapped nodes. Graph 328 illustrates the mapped nodes. It must be appreciated that in one embodiment, graphical representation of the mapped nodes may be presented directly to the user. Parsing module 118B, in this embodiment, detects that Texas A&M University is an institute. A category can be embodied as education relating to the word "studied", as the parsing module 118B recognizes the word "studied" and makes this determination using the knowledge base or any other pre-loaded ontology. In the present embodiment, parsing module 118B using LOD, and a pre-defined knowledge base maps nodes for "Texas A&M University". Multiple nodes are generically represented by nodes 324 which includes a multiplicity of nodes representing each of a multiplicity of mapped nodes. Embodiments of mapped nodes are shown in FIG. 3B and are named: major 322, institute 320, degree 318, start date 316, and end date 314. In the embodiment shown in FIG. 3B, the nodes are all potential categories of related information that have been deemed related to the parsed phrase "Texas A&M University".

In the present embodiment, parsing module 118B also determined which of the nodes are not satisfied or not known within the existing ontology or knowledge base. If a node is not known then, parsing module 118B may inquire from the user more information. For example, major 322 of john is not known therefore parsing module 118B (through the user interface and as depicted in FIG. 3A) inquires what the major of john was at Texas A&M University on the other hand institute 320 is known because parsing module 118B, using the knowledge base, determines that "Texas A&M University" is an institute and therefore parsing module 118B determines that institute 320 is defined. The user answers by uttering "aerospace engineering" and therefore the "major" node of "Texas A&M University" is satisfied (because we now know the answer to that particular node).

At 208, updating module 118C may assign a confidence score to the ontology for editing within the language instance. In an embodiment, the confidence score maybe based on how many of the mapped nodes have been answered or satisfied. For example, updating module 118C may assign a 100% confidence score to a language instance with ten nodes if all the ten nodes are satisfied and 10% if only one of the ten nodes are satisfied.

In the present embodiment, language instance 304 has five nodes and only one of them (institute 320) has been satisfied. Therefore the confidence score is 1/5 or 20%.

At 210, updating module 118C may determine whether a predetermined confidence score threshold is satisfied by comparing the assigned confidence score to the threshold criteria. If the threshold is satisfied, updating module 118C may, as illustrated in 210, update the knowledge base with the new satisfied nodes and cognitive lead. If updating module 118C determines that the pre-determined threshold is not satisfied by the assigned confidence score, as illustrated by 214, updating module 118C may further inquire the user in order to satisfy one or more nodes. Updating module 118C, in one embodiment, may ask the user questions regarding some unsatisfied nodes in order to satisfy said mapped node. User may satisfy said mapped node by answering the question posed by updating module 118C. Updating module 118C may then re-assign a new confidence score based on the new satisfied mapped node numbers and repeat steps 208, 210, and 212.

In the present embodiment, the confidence rate, as shown above, is 20% and a pre-determined threshold is 40%, therefore updating module 118C inquires more information in order to satisfy more nodes and ultimately satisfy the confidence score threshold. Updating module 118C presents to the user, inquiry 306. Inquiry 306 includes a question about major 322 and related to the major of the subject of the language instance 304 (john). Inquiry 306 inquiries about John's major. User 302, in response to inquiry 306, inputs an answer (in this case, language instance 308). Language instance 308 includes "aerospace engineering" which is the answer to the inquiry about john's major. Updating module 118C, in the present embodiment, assigns a second confidence score (after the satisfaction of major 322). The new confidence score is 40% (due to two out of five nodes being satisfied). Because the new confidence score, satisfies the confidence score threshold, updating module 118C, in the present embodiment, updates the knowledge base with the newly acquired information (this is represented by box 330).

Additionally, in another embodiment, updating module 118C may determine if a given answer to any of the inquiries by ontology editing program 108 is a simple fact, ambiguous fact, or partially complete fact. An ambiguous fact is an answer which is open to more than one interpretation or has a category which does not match with the category of the inquiry (e.g. inquiry is asking about a location and the answer is regarding a time period). A partial fact is an incomplete fact or a sentence. In that embodiment whether updating module 118C updates the knowledge base is dependent upon the above mentioned determination. In that embodiment, updating module 118C using semantically analytical methods, may make this determination. If the answer is a simple fact, updating module 118C may update the knowledge; if the answer is ambiguous fact or partially complete fact, updating module 118C may ask a follow up question to get more information and expects new input from a user; and finally if not either of the above-mentioned, the updating module 118C may discard the answer and re-inquire the user.

For example in the present example if the answer (i.e. language instance 308) was "London" instead of "Aero Space Engineering", updating module 118C may determine (using above-mentioned methods including but not limited to using existing knowledge banks or parsing methods) that London is a location and therefore the answer is ambiguous to inquiry 306 regarding major 322. In that embodiment, updating module 118C may re-inquire the same question (by asking the inquiry 306 again). In another embodiment, given the same ambiguous answer, updating module 118C may inquire about another node. For example, in that embodiment updating module 118C may inquire about degree 318 or start date 316 instead of major 322.

Furthermore in a variation of the embodiment disclosed in FIG. 2 and FIG. 3A-B, another method of calculating the confidence score is presented. In that embodiment, user 302, inputs language instance 304. The parsing module 118B, in that embodiment and using above-mentioned methods and/or using existing knowledge base or other pre-loaded ontologies, parses language instance 304, and determines with a 90% (0.9) confidence rate (0.9) that John could be a node of type Person (person 310), 80% (0.8) confidence rate that Texas A&M University is a type Institute (institute 320). Parsing module 118B also determines, in this embodiment due to the word "studied", with a 70% (0.7) confident that John and Texas A&M University belong to the education 312. As a result, parsing module 118B in this embodiment, determines an overall confidence using a function of all 3 confidence scores. In this embodiment parsing module 118B assigns the confidence score as a product of all three scores (0.9*0.8*0.7)=0.504. In this embodiment, the pre-defined confidence score threshold is set at 0.5, therefore language instance 304 may be added to the knowledge base as the confidence score satisfies the threshold.

Figure 4:
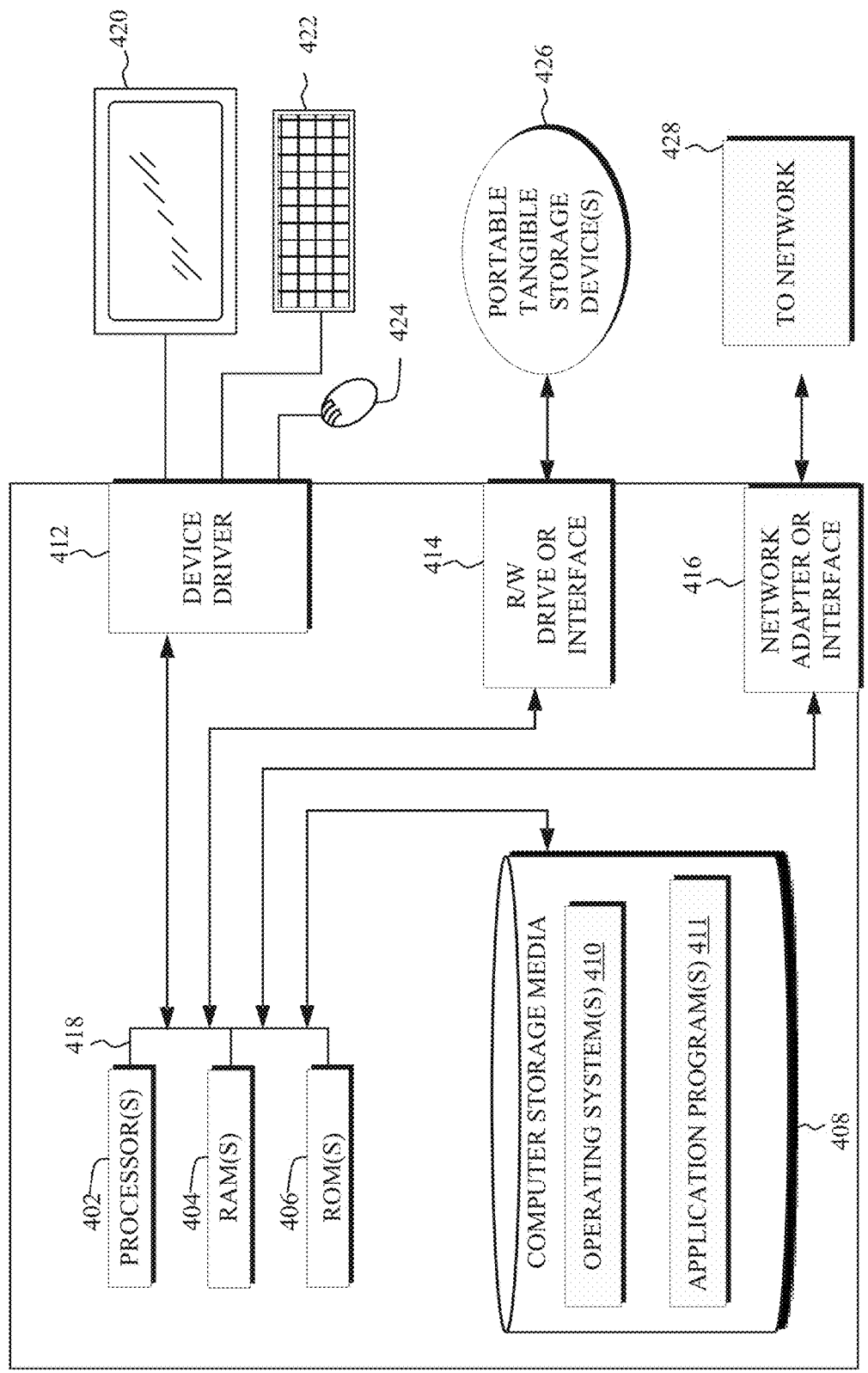
FIG. 4 is a block diagram of internal and external components of computers and servers depicted in FIG. 1, according an embodiment of the present disclosure.

Referring now to FIG. 4 of components a computer system, for example server 112 and data source 120, of computing environment 100 of FIG. 1, in accordance with an embodiment of the present disclosure.

Server 112 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 112 and computer 102 may also include an R/W drive or interface 414 to read from and write to one or more portable computer readable storage media 426. Application programs 411 on server 112 and computer 102 may be stored on one or more of the portable computer readable storage media 426, read via the respective R/W drive or interface 414 and loaded into the respective computer readable storage media 408.

Server 112 may also include a network adapter or interface 416, such as a TCP/IP adapter card or wireless communication adapter (such as a 4G wireless communication adapter using OFDMA technology). Application programs 411 on server 112 and may be downloaded to the computing device from an external computer or external storage device via a network (for example, the Internet, a local area network or other wide area network 428 or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 112 and computer 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present disclosure. Therefore, the present disclosure has been disclosed by way of example and not limitation.

What is claimed is:

1. A computer system for knowledge based ontology editing, comprising:
   one or more computer devices each having one or more processors and one or more tangible storage devices; and
   a program embodied on at least one of the one or more storage devices, the program having a plurality of program instructions for execution by the one or more processors, the program instructions comprising instructions for:
   receiving, from a remote server through a network, by spoken words of a user into a microphone of the computer, a language instance to update a knowledge base, using a computer, the network being an Internet connection;
   semantically parsing the language instance to detect an ontology used for editing the knowledge base using predetermined grammatical values comprising identifying a subject for the received language instance and part of speech (POS) tags, wherein POS tags comprise word-category disambiguation and marking up a word in text corpus as corresponding to particular part of speech, based on a definition and a context of the word;

mapping parsed words in the language instance to one or more nodes of the ontology used for editing based on an ontology database and the knowledge base, wherein the knowledge base comprises a Linking Open data (LOD) web data form;

determining whether the mapped nodes are defined or undefined within the Linking Open data (LOD) web data form;

inquiring the user as to information regarding the undefined nodes by displaying a question regarding the undefined nodes on the user interface on the computer;

receiving an answer to the question regarding the undefined nodes on the user interface from the user;

calculating a first confidence score based on a number of the defined and undefined mapped nodes; and updating the Linking Open data (LOD) web data form based the answer when the first confidence score meets a pre-defined threshold.

\* \* \* \* \*